G. W. JOHNSON.
BOLL WEEVIL EXTERMINATOR.
APPLICATION FILED DEC. 6, 1917.
1,284,698.
Patented Nov. 12, 1918.
3 SHEETS—SHEET 1.
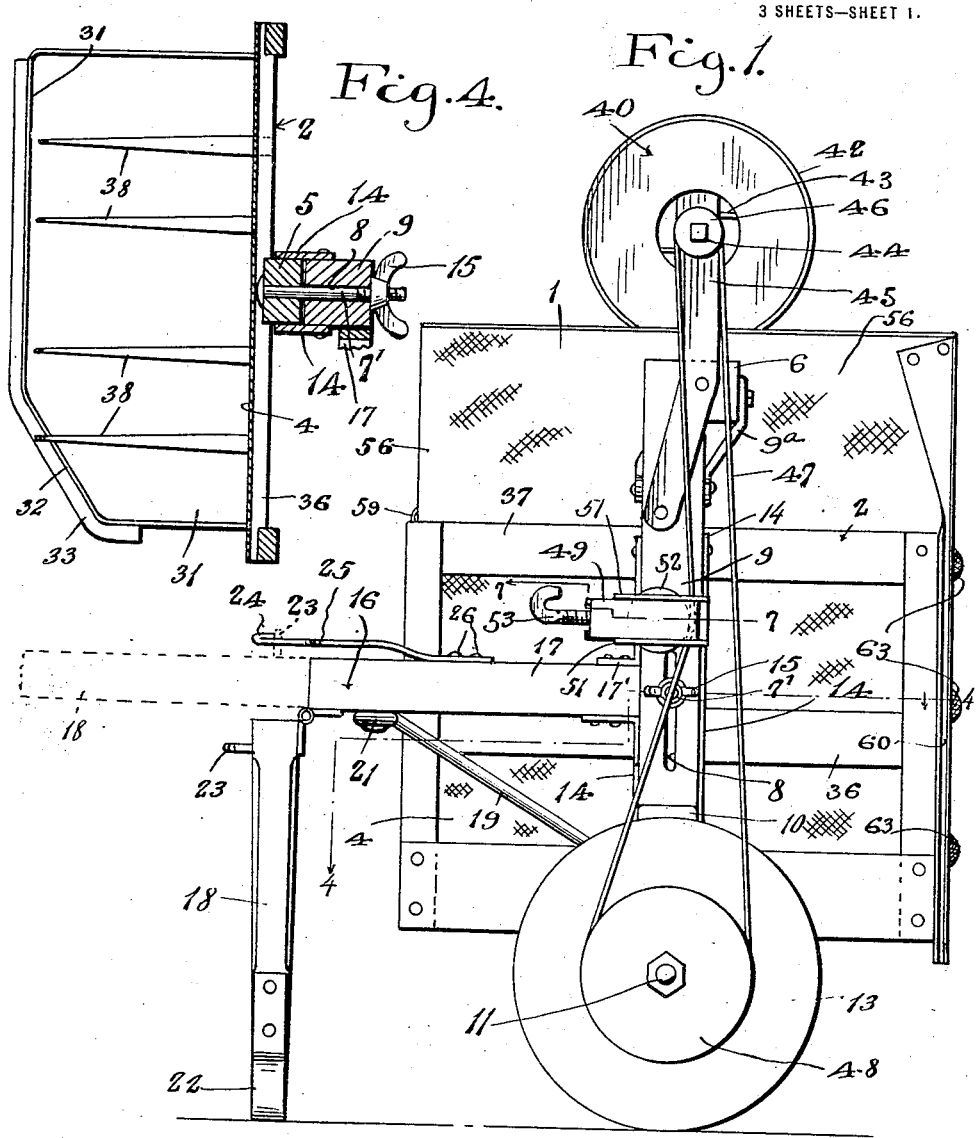
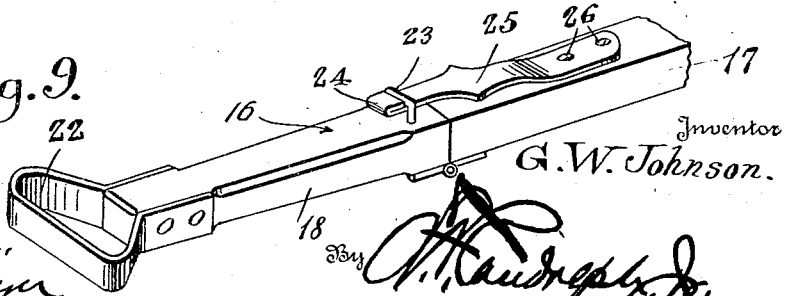

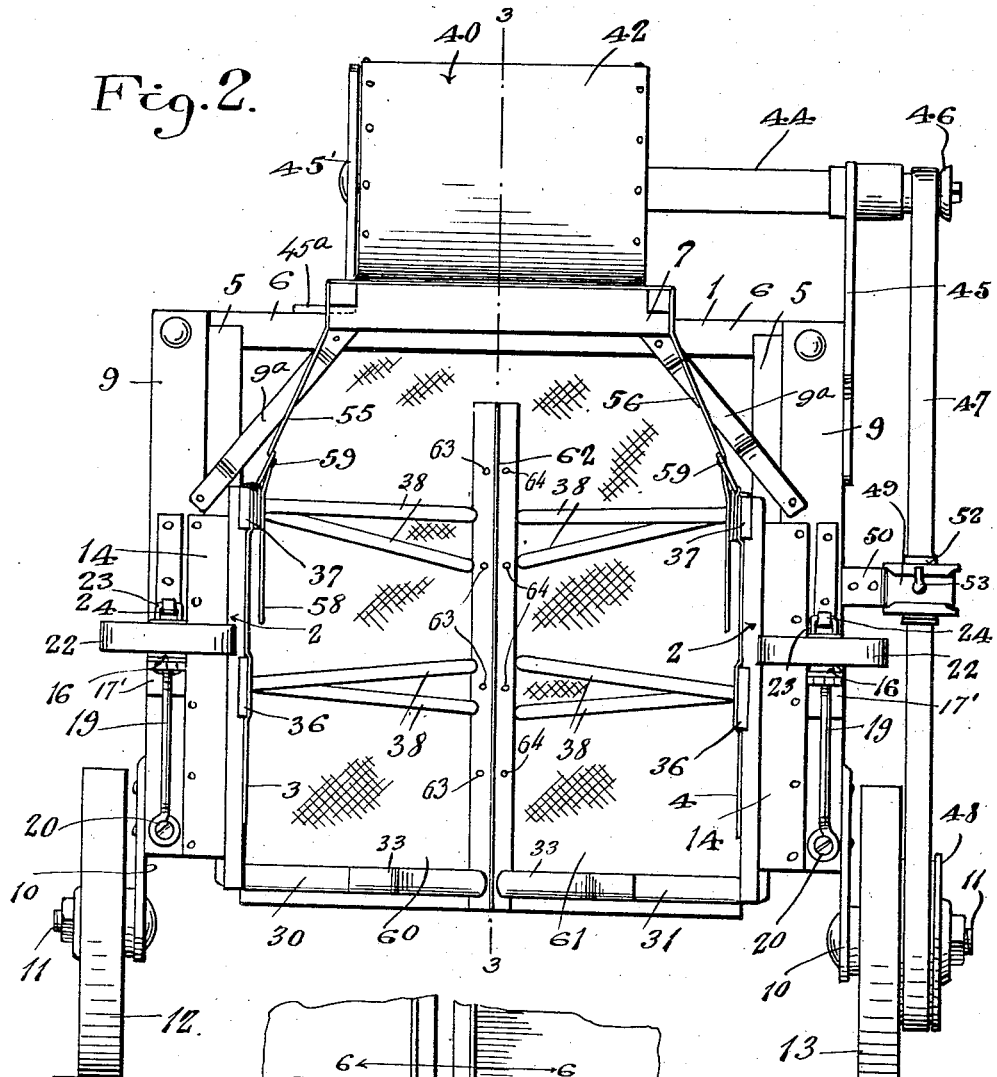

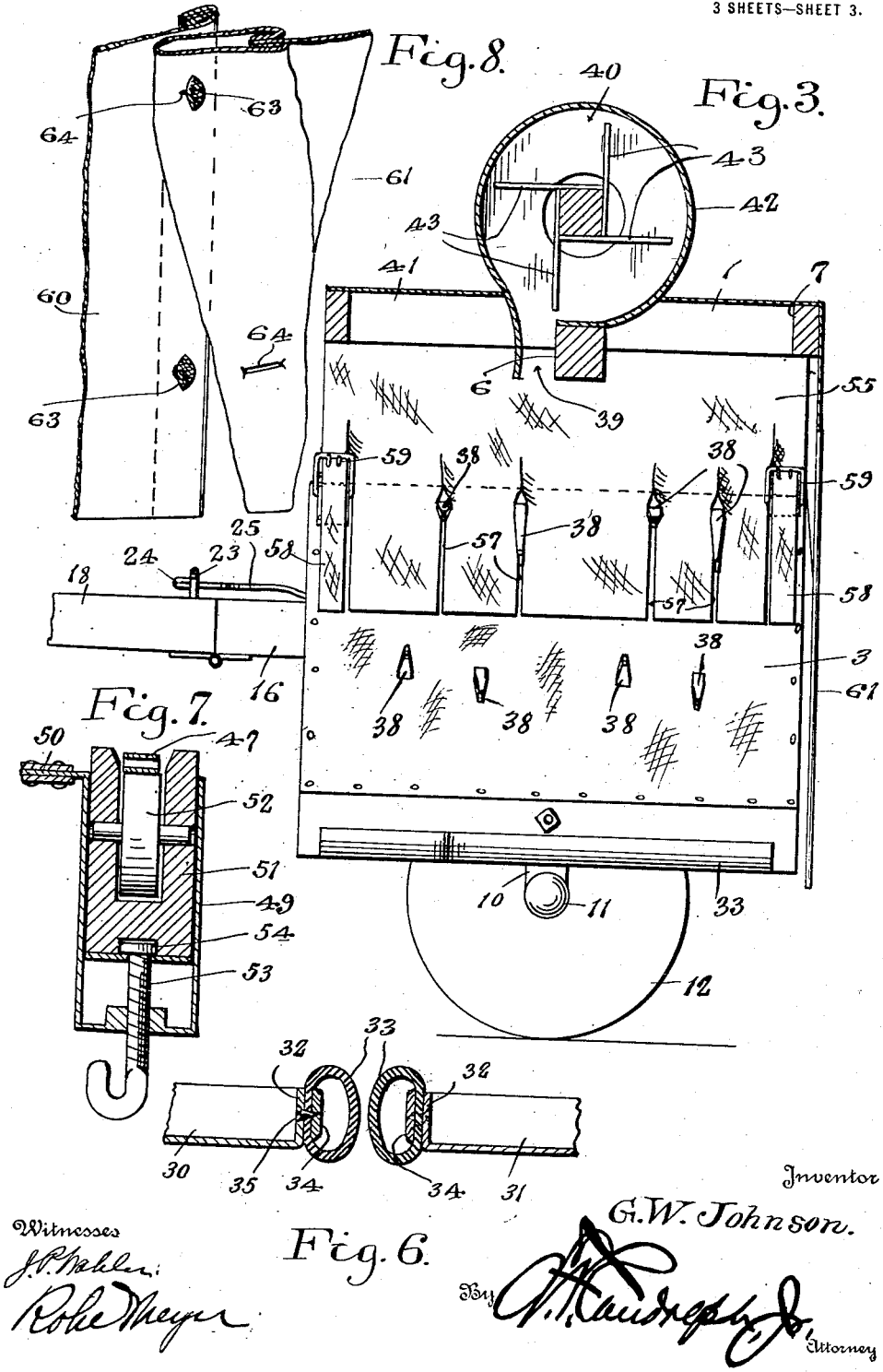

UNITED STATES PATENT OFFICE.

GEORGE WASHINGTON JOHNSON, OF SARDIS, MISSISSIPPI.

BOLL-WEEVIL EXTERMINATOR.

1,284,698.  Specification of Letters Patent.  Patented Nov. 12, 1918.

Application filed December 6, 1917. Serial No. 205,803.

*To all whom it may concern:*

Be it known that I, GEORGE W. JOHNSON, a citizen of the United States, residing at Sardis, in the county of Panola and State of Mississippi, have invented certain new and useful Improvements in Boll-Weevil Exterminators; and I do hereby declare the following to be a full, clear, and exact description of the invention, such as will enable others skilled in the art to which it appertains to make and use the same.

This invention relates to a boll weevil exterminator and the primary object of the invention is to provide a boll weevil exterminator which includes weevil receiving pans, plant shaking members and an air blast fan which discharges a blast of air downwardly through the body of the machine for blowing the weevils which are shaken from the plant into the weevil receiving pans, and further to place a viscous material within the pans, to which the weevils will adhere.

An object of this invention is to provide means for supporting the supporting wheels of the boll weevil catcher or exterminator which means is adjustably connected to the body of the exterminator for adjusting the elevation of the supporting wheels with respect to the body of the weevil exterminator for regulating the latter in accordance with the height of the cotton plant being worked upon.

Another object of this invention is to provide two supporting wheels for the exterminator and thills by means of which the exterminator is drawn over fields, and further to make the thills in sections, so that when the exterminator is not in use the forward sections of the thills may be bent downwardly to form supporting legs for coacting with the wheels to support the exterminator structure in a horizontal position.

With the foregoing and other objects in view, this invention consists in such novel features of construction, combination, and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a side elevation of the improved boll weevil exterminator.

Fig. 2 is a front view of the exterminator.

Fig. 3 is a vertical section through the exterminator taken on the line 3—3 of Fig. 2.

Fig. 4 is a horizontal section through the exterminator taken on the line 4—4 of Fig. 1.

Fig. 5 is a fragmentary view illustrating the forward end of the weevil receiving pan.

Fig. 6 is a section on the line 6—6 of Fig. 5.

Fig. 7 is a fragmentary view on the line 7—7 of Fig. 1.

Fig. 8 is a fragmentary perspective view showing the manner of constructing the rear side of the body of the exterminator, and Fig. 9 is a fragmentary view of one of the thills used for drawing the exterminator over fields.

Referring more particularly to the drawings, 1 indicates the main body of the exterminator as an entirety, and this body is constructed of a skeleton structure 2 formed of wood or analogous material which skeleton structure has rubberized fabric or other analogous material attached thereto to form the sides and top of the body of the exterminator. The sides 3 and 4 of the exterminator have vertically extending bracing bars 5 attached thereto.

A cross bar 6 is provided which forms a support for the skeleton frame work 7 of the top of the exterminator. The vertically extending bars 5 have bolts 7' extending therethrough which bolts extend through slots 8 formed in vertically positioned bars 9. The bars 9 have downwardly extending plates 10 attached to their outer surfaces at their lower ends and these plates support axles 11 upon which the supporting wheels 12 and 13 of the boll weevil exterminator are mounted. Suitable angle braces 9ª are attached to the vertical bars 9 and the cross bar 6 as shown in Fig. 2 of the drawings.

The bars 9 have guiding plates 14 attached to their sides which overlap the sides of the bars 5 as clearly shown in Fig. 4 of the drawing for guiding the vertical movement of the bars 9 along the bars 5 which vertical movement is provided to permit of the adjustment of the elevation of the supporting wheels 12 and 13 with respect to the main body 1 of the exterminator so as to regulate the position of the main body in accordance with the height of plants being operated upon. Wing nuts 15 are mounted upon the bolts 7' for clamping engagement with the outer surfaces of the bars 9 for holding these bars in adjusted position.

The bars 9 have thills 16 attached thereto through the medium of angled irons 17', through the medium of which thills the exterminator is drawn over cotton plants. The thills 16 are composed of rigid sections 17 and hinged sections 18. The rigid sections 17 are braced by suitable braces 19 that are attached to the bars 9 as shown at 20 and to the under surface of the rigid portions 17 as shown at 21. Hand grips 22 are carried by the outer ends of the hinged sections 18 and these hinged sections are provided for movement into downwardly extending vertical positions, so that the hand grips 22 will engage the ground or surface upon which the exterminator is resting for holding the exterminator in a horizontal position as indicated in solid lines in Fig. 1 of the drawings when the exterminator is not in use. The hinged sections 18 have substantially U-shaped straps or staples 23 carried thereby which receive the free ends 24 of spring latches 25. The spring latches 25 are attached to the upper surface of the rigid portions 17 as shown at 26 and their outer free ends are doubled back upon themselves to provide a catch for engagement with the staples 23 to hold the hinged sections 18 in horizontal alinement with the rigid sections 17 when the thills are used for pulling the exterminator.

The sides 3 and 4 of the skeleton frame work 2 of the main body 1 of the exterminator have a pair of insect receiving pans 30 and 31 attached to their lower edges and extending inwardly toward each other. The inner edges of the pans 30 and 31 are spaced to permit the passage of the pans of each side of cotton plants and they have their forward inner corners cut away as shown at 32 to provide an enlarged mouth for the space between the pans which will engage the plants and properly guide them between the pans. The inner edges of the pans, which are next to the cotton plants have resilient tubes 33 attached thereto. The tubes 33 are preferably formed of rubber or analogous soft resilient material so as to prevent abrasion of the cotton plants by the edges of the pan. These tubes 33 may be attached to the inner edges of the pan in any suitable manner; however in Fig. 6 of the drawing wood strips 34 are illustrated as positioned within the tubes which strips receive screws or analogous attaching devices 35 that extend through the inner edges of the pan and through the tubes for connecting the tubes to the pan.

The horizontally extending rails or bars 36 and 37 of the sides 3 and 4 of the skeleton frame work 2 have a plurality of plant striking and agitating fingers 38 carried thereby. The fingers 38 which are attached to the bars 37 are positioned above the fingers 38 which are attached to the bars 36, as clearly shown in Fig. 2 of the drawings and these fingers are disposed substantially in staggered relation to each other as shown in Fig. 3 of the drawings so that the plant over which the boll weevil exterminator travels will be thoroughly agitated or shaken for shaking boll weevils, and infected squares from the plants. The boll weevils, infected squares and the like, which are shaken from the plant by the fingers 38 are forced downwardly into the pans 30 and 31 by a blast of air which enters the top of the body 1 from the exhaust or outlet 39 of a fan structure 40. The fan structure 40 is supported by a suitable supporting bar 41 which is in turn carried by the top 7 of the boll weevil exterminator. The fan casing 42 also rests upon the bar 6 and the outlet 39 of the fan is positioned along side of the bar 6 for guiding the air blast downwardly through the interior of the main body 1 of the exterminator, thereby forcing the weevils into the pans 30 and 31, which pans have been previously filled with a viscous material to which the weevils will adhere.

The rotor 43 of the fan structure 40 is carried by a shaft 44 which is supported at one end by a standard 45 that extends upwardly from one of the bars 9 and at the other end by a standard 45' the lower end of which is angled as shown at 45ª and attached to the cross bar 6. The shaft 44 has a pulley 46 mounted thereon about which a belt 47 travels. The belt 47 also travels about a pulley 48 which is attached to the supporting wheel 13, whereby the shaft 44 and the rotor 43 of the fan will be rotated by the rotation of supporting wheel 13. A horizontally positioned substantially U-shaped metal supporting structure 49 is attached to the side 4 of the body 1 by a strap 50 and it slidably supports a slot 51 which carries an idler pulley 52. The idler pulley 52 engages the belt 47, for regulating the tension of the belt. The block 51 is adjusted within the U-shaped support 49 through the medium of a feed screw 53 which extends through the bight portion of the support 49 and has its inner end swivelly connected as shown at 54 to the block 51 so that the rotation of the feed screw will move the block 51 and consequently the idler 52 longitudinally of the U-shaped frame 49 for regulating the tension of the belt 47.

The bar 6 is carried by the upper ends of the vertical adjustable bars 9 and consequently the top 7 of the body 1 is also adjustably supported for movement therewith, since it is supported by the bar 6. The top 7 is connected to the sides 3 and 4 of the body 1 by curtains 55 and 56 of flexible rubberized fabric, the lower edges of which are split as indicated at 57 to extend over the fingers 38 carried by the bars 37 and also to provide straps 58 which are connected to the fabric that forms the sides 3 and 4 through the medium of buckles 59 carried by the sides. The flexibility of the fabric curtains 55 and 56 will permit of the adjustment of the top 7 with respect to the sides 3 and 4 and the pans 30 and 31 which are carried thereby and the different adjustments of the bars 9 for regulating the elevation of the pans 30 and 31 with respect to the supporting wheels 12 and 13 and they will also form an inclosure for the space between the upper edges of the sides 3 and 4 and the top 7 insuring the proper action of the air blast from the fan 40.

The rear side or end of the body is formed of a flexible fabric sheet or curtain which is split down the middle as shown at 62 in Fig. 2 of the drawings to permit the plants to pass throughout the rear side or end of the body. The portion which is positioned upon one side of the split 62 has buttons 63 carried thereby which are received by button holes 64 formed in the portion 61 along the edge thereof at the split 62 and thus the length of the split may be regulated as desired.

Summing up, generically the operation of the improved boll weevil exterminator is as follows: The exterminator is drawn over growing cotton plants after the bars 9 have been adjusted to cause the striking fingers 38 to properly engage the cotton plants, and during the movement of the exterminator, the cotton plants will be engaged by the striking fingers 38 which will agitate the plants and shake the weevils, other insects and infected squares therefrom. The operation of the fan, through the medium of the belt 47 and pulleys 46 and 48 will force a downward air blast through the interior of the body of the boll weevil exterminator and consequently force the weevils downwardly into the pans 30 and 31, where they will be engaged by the viscous material and which material may be removed from the pans in any suitable manner.

From the foregoing description taken in connection with the accompanying drawings the advantages of construction and the method of operation of the improved boll weevil exterminator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a boll weevil exterminator, a body including sides, a pair of vertical bars adjustably supporting said body, plates carried by the lower ends of said bars, supporting wheels carried by the lower ends of said plates, a cross bar connecting the upper ends of said plates, a top for said body supported by said cross bar, flexible curtains connecting said top to the upper edges of said sides, insect receiving pans carried by the lower edges of said sides and extending inwardly for positioning one upon each side of a plant, and means for holding the pans in an adjusted elevated position with respect to said wheels.

2. In a boll weevil exterminator, a body including sides, a pair of vertical bars adjustably supporting said body, plates carried by the lower ends of said bars, supporting wheels carried by the lower ends of said plates, a cross bar connecting the upper ends of said bars, a top for said body supported by said cross bar, flexible curtains connecting the top to the upper edge of said sides, insect receiving pans carried by the lower edges of said guides extending inwardly for positioning one upon each side of a plant, means for holding the pans in an adjusted elevated position with respect to said wheels, an air blast carried by said top and having its outlet positioned for directing an air blast downwardly within the body to force insects into said pans, a flexible curtain forming a back for said body, said curtain being split to allow it to pass over cotton plants, and an attaching means for regulating the length of said split.

3. In a boll weevil exterminator, a body including sides, a pair of vertically adjustable bars supporting said body, plates carried by the lower ends of the said bars, supporting wheels carried by the lower ends of said plates, a cross bar connecting the upper ends of said bars, a top of said body supported by said cross bar, flexible curtains connecting said body to the upper edges of said sides, insect receiving pans carried by the lower edges of said sides, and extending inwardly for positioning one upon each side of the frame, and a cushioning element carried by the edges of the pan and adapted to engage the sides of a plant.

In testimony whereof I affix my signature in presence of two witnesses.

his
GEORGE  ×  WASHINGTON JOHNSON.
       mark

Witnesses:
 C. B. Young,
 T. W. Armistead.